(12) United States Patent
Epars et al.

(10) Patent No.: US 10,143,628 B2
(45) Date of Patent: Dec. 4, 2018

(54) FEEDING BOTTLE FOR PREPARATION OF A NUTRITIONAL COMPOSITION

(71) Applicant: NESTEC S.A., Vevey (CH)

(72) Inventors: Yann Epars, Penthalaz (CH); Alain Meier, Caneggio (CH); Anne Roulin, Yverdon-les-bains (CH); Remy Jacquet, Le Locle (CH)

(73) Assignee: Nestec S.A., Vevey (CH)

( * ) Notice: Subject to any disclaimer, the term of this patent is extended or adjusted under 35 U.S.C. 154(b) by 485 days.

(21) Appl. No.: 14/352,221

(22) PCT Filed: Oct. 10, 2012

(86) PCT No.: PCT/EP2012/070003
§ 371 (c)(1),
(2) Date: Apr. 16, 2014

(87) PCT Pub. No.: WO2013/057014
PCT Pub. Date: Apr. 25, 2013

(65) Prior Publication Data
US 2014/0284298 A1 Sep. 25, 2014

(30) Foreign Application Priority Data
Oct. 17, 2011 (EP) .................................... 11185426

(51) Int. Cl.
*B01D 35/00* (2006.01)
*A61J 9/00* (2006.01)
(Continued)

(52) U.S. Cl.
CPC ................. *A61J 9/00* (2013.01); *C02F 1/003* (2013.01); *C02F 1/44* (2013.01); *C02F 2201/004* (2013.01); *C02F 2307/02* (2013.01)

(58) Field of Classification Search
CPC ... A61J 9/00; A61J 11/04; A61J 11/045; A61J 11/00; A61J 11/008
(Continued)

(56) References Cited

U.S. PATENT DOCUMENTS 6,344,146 B1 * 2/2002 Moorehead ............. C02F 1/002
210/136
6,733,669 B1 * 5/2004 Crick ....................... C02F 1/003
210/244
(Continued)

FOREIGN PATENT DOCUMENTS

DE 20106238 7/2001
GB 2139903 11/1984

OTHER PUBLICATIONS

International Search Report corresponding to related International Patent Application No. PCT/EP2012/070003 dated Jan. 16, 2013.
(Continued)

*Primary Examiner* — Fenn C Matthew
*Assistant Examiner* — Cynthia Collado
(74) *Attorney, Agent, or Firm* — K&L Gates LLP

(57) ABSTRACT

The invention relates to a single-use feeding bottle for dispensing an aqueous nutritional composition to a human from a powdered or concentrated liquid nutritional formula base contained therein and being provided with a connecting member for connecting the bottle to external liquid dispenser adapted to supply liquid to the bottle, the bottle comprising at least one compartment forming a cavity for containing a predefined amount of powdered or concentrated liquid nutritional formula base for the preparation of the nutritional composition upon hydration with the supplied liquid, a neck portion in fluid communication with the compartment, and liquid inlet designed to be supplied with liquid from the liquid dispenser, the bottle furthermore comprising a filter assembly in the flow path of the liquid
(Continued)

from the inlet to the compartment, the filter assembly configured to remove contaminants from liquid fed into the compartment through the inlet.

20 Claims, 13 Drawing Sheets

(51) Int. Cl.
   *C02F 1/00* (2006.01)
   *C02F 1/44* (2006.01)

(58) Field of Classification Search
   USPC ..... 215/11.1, 11.4, 11.5, 11.6; 210/244, 282, 210/455, 232
   See application file for complete search history.

(56) References Cited

U.S. PATENT DOCUMENTS

| | | | |
|---|---|---|---|
| 7,503,461 B1 | 3/2009 | Hoffman et al. | |
| 2007/0102332 A1* | 5/2007 | Bommi | B01D 21/0012 210/136 |
| 2008/0277020 A1* | 11/2008 | Windmiller | B65D 1/06 141/113 |
| 2010/0108590 A1* | 5/2010 | Curt | B01D 29/21 210/232 |

OTHER PUBLICATIONS

International Written Opinion corresponding to related International Patent Application No. PCT/EP2012/070003 dated Jan. 16, 2013.

* cited by examiner

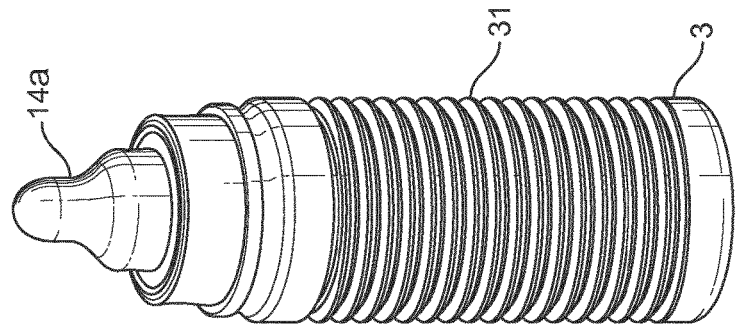
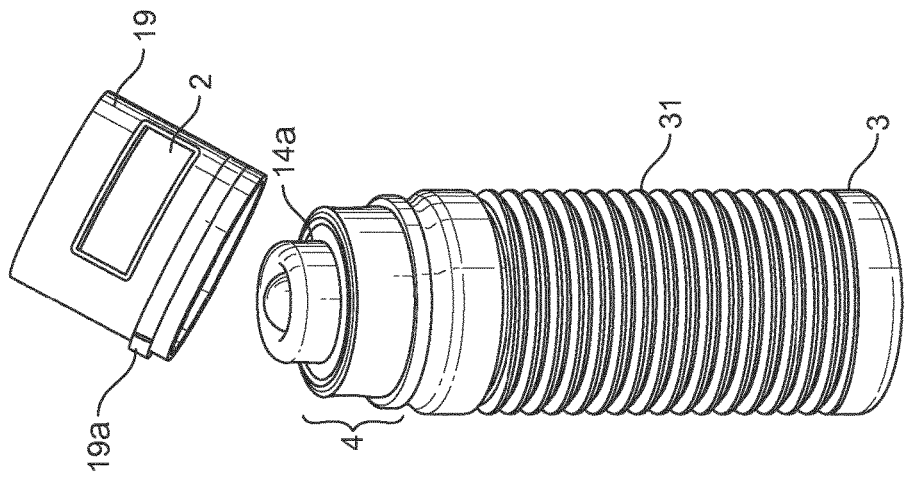
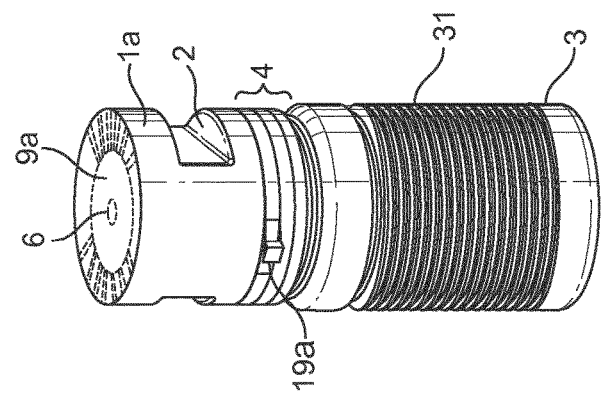
FIG. 13c
FIG. 13b
FIG. 13a

FEEDING BOTTLE FOR PREPARATION OF A NUTRITIONAL COMPOSITION

CROSS REFERENCE TO RELATED APPLICATIONS

The present application is a National Stage of International Application No. PCT/EP2012/070003, filed on Oct. 10, 2012, which claims priority to European Patent Application No. 11185426.1, filed Oct. 17, 2011, the entire contents of which are being incorporated herein by reference.

FIELD OF THE INVENTION

The present invention relates to a feeding bottle for the hygienic preparation of a nutritional composition, especially an infant/toddler formula. More particularly, the invention relates to a feeding bottle for containing a predefined amount of nutritional formula base for the preparation of a ready-to-drink aqueous nutritional formula composition in combination with supplied liquid.

BACKGROUND OF THE INVENTION

Nutritional formulas or compositions can be, for instance, infant formulas or also nutritional liquids for toddlers, invalids, elderly people, humans having nutritional deficiencies and/or having a deficient immune system or athletes.

In general, different forms in which nutritional compositions may be provided exist, each of them having their own advantages.

For instance, although the nutritional composition provided in a powder form have a relative high nutritional quality, the preparation thereof may be regarded as inconvenient and time consuming, since powder has to be provided in correct amount to a drinking vessel. In addition, water that has been boiled in advanced and allowed to cool has to be poured into said vessel containing the powder in order to prepare a liquid nutritional composition such as an infant formula. The same inconvenient preparation process exists for nutritional compositions that are provided in concentrated liquid form.

As an alternative, single-serving solutions are known which enable to provide a predefined amount of comestible product to a consumer.

WO2009/083495 for example relates to a packaging for a consumable articles such as a comestible product or medicine, that comprises a container including an amount of the consumable article necessary for a single use, wherein the container is provided at one end thereof with an opening being surrounded by a rigid skirt adapted for being connected to a liquid container such as a bottle. Opening means of the container enable to mix the consumable article of the container with liquid provided within the bottle.

A more convenient preparation of a nutritional composition is enabled by capsule-based preparation devices in which a single-serving of a preferably powdered composition being provided within a cartridge or capsule is dissolved by means of injection with filtered respectively sanitized liquid such as water. Thereby, any undesired contaminants should be removed from the liquid before the liquid is mixed with the ingredients. For this purpose, such a device preferably comprises filter means for filtering respectively sanitizing the water.

In recent development, capsules with integrated antimicrobial filter have been introduced into the market in order to ensure the provision of filtered respectively sanitized liquid to the capsule for the preparation of the nutritional composition.

U.S. Pat. No. 6,733,669B1 relates to a multi-use water filter bottle comprising a top member and a bottom member threadedly connected having a filtering material therebetween; the top member having a water inlet for filling the bottle with unfiltered water and a water outlet for dispensing water from the bottle. Such bottle is not adapted for providing a safe delivery of an aqueous nutritional composition such as an infant formula composition. In particular, there is no separation between the incoming water and filtered water. Therefore, filtered water can be spoiled by contact with the incoming water before being dispensed. This solution is not acceptable to meet the hygiene level required for infant formula delivery.

WO2009/092629A1 for example relates to a capsule for use in a beverage production device, the capsule containing ingredients for producing a nutritional liquid when a liquid is fed into the capsule at an inlet face thereof, the capsule being provided with an anti-microbial filter.

WO2010/128051A1 relates to a capsule for preparing a nutritional product including a filter adapted for removing contaminants wherein the filter is formed of a filter unit which comprises a filter membrane and an outlet wall for supporting the filter membrane; the outlet wall comprising at least one liquid outlet communicating with the compartment.

A drawback with the known capsule-based preparation devices is the cleaning and sterilizing of the baby bottle that is to be carried out after each and/or before each preparation of the beverage. Thereby, the user is not always aware or informed of the necessary cleaning and sterilizing procedures of the baby bottle which may lead to safety concerns.

Another drawback comes from the fact that the release of a reconstituted liquid composition from a capsule requires a complete dissolution or dispersion of the ingredients/formula with the diluents (e.g. ambient or warm water) to ensure a reliable and complete release of the resulting composition from the capsule to the serving bottle.

Therefore, a more convenient solution is sought-after which overcomes these problems.

In particular, it is desirable to reduce a necessary cleaning and sterilizing procedure during the preparation of a nutritional composition to a minimum extent.

A solution is also sought-after which enables a facilitated storage and the enhanced release of a predefined amount of nutritional composition. Thereby, a full release of the dedicated amount of the nutritional composition contained in the storage medium is desired to ensure a complete feed to the consumer.

The present invention seeks to address the above-described problems. The invention also aims at other objects and particularly the solution of other problems as will appear in the rest of the present description.

OBJECT AND SUMMARY OF THE INVENTION

In a first aspect, the present invention relates to a single-use feeding bottle for dispensing an aqueous nutritional composition to a human from a predefined powdered or concentrated liquid nutritional formula base and being provided with connection means adapted for connecting it to external liquid dispensing means adapted to supply liquid to the bottle. The feeding bottle comprises at least one compartment forming a cavity for containing a predefined amount of powdered or concentrated liquid nutritional formula base for the preparation of an aqueous nutritional formula composition upon hydration with the supplied liquid, a neck portion in fluid communication with the compartment, and liquid inlet means designed to be supplied with liquid from the liquid dispensing means, the bottle furthermore comprising a filter assembly in the flow path of the liquid from said inlet means to the compartment, the filter assembly being configured to remove contaminants from liquid fed into the compartment through the inlet means.

More particularly, the filter assembly separates the liquid inlet means from the compartment and outlet means so that only filtered liquid is allowed to pass through the outlet means. Therefore, there is no compartment allowing a direct communication of liquid between the inlet means and outlet means for bypassing the filter assembly. Therefore, there is no risk of recontamination of the aqueous nutritional composition or liquid before being supplied.

In the following application, the simplified terms "formula base" means a powdered or concentrated liquid nutritional formula base specifically designed for infants, toddlers, humans having nutritional deficiencies and/or having a deficient immune system, invalids, elderly people, or athletes; such formula base requiring the addition of a liquid, such as water, for the preparation of a ready-to-drink nutritional composition.

According to a preferred mode of the present invention, a pre-metered amount of formula base is contained in a sealed bottle. In particular, such sealing refers to the closing of the container at a manufacturing site after a pre-metered amount of formula has been dosed and filled in the bottle under clean and sterile or quasi-sterile conditions.

Hence, the hygienic requirement of cleaning and sterilizing the bottle, such as for infants, is overcome.

Furthermore, as the formula base is already provided in the compartment which is used for the preparation of the nutritional composition which can be directly fed to the consumer, e.g., a baby, it is ensured that the correct and full amount of nutritional ingredients is made available for feeding the consumer.

Moreover, the potential risk of contamination of the dispensed product during the preparation and/or by contact with a soiled or dirty dispensing recipient is potentially eliminated.

The bottle according to the present invention is preferably a disposable, single-use and sealed bottle. Moreover, the bottle is preferably a baby bottle.

The term "sealed" means that the bottle is hermetically closed in such a manner that the ingress of liquid and contaminants, in particular, solid particles and micro-organisms, from the environment into the bottle is prevented. The "sealed" does not necessarily mean that the closure is fully impermeable to gas.

The bottle is preferably made of light packaging material. The compartment of the bottle is preferably made of thin plastic preferably of a thickness lower than 150 microns, more preferably comprised between 45 and 100 microns. In other words, the compartment have sufficiently thin walls to provide a very light bottle.

The weight of the bottle without the nutritional composition may be between 5 and 10 grams. More preferably, the weight of the bottle is between 8 and 12 grams.

The bottle is preferably made of thermoplastic such as PET, PE, PP, PLA, a paper-plastic laminate, paper-plastic-aluminium laminate, and combinations thereof. Thereby, the bottle is preferably made as an integral piece e.g. by means of blow-moulding or injection-moulding.

The compartment of the sealed bottle can comprise a volume of between 50 and 300 ml, preferably 70 and 260 ml, most preferably 90 to 200 ml. Accordingly, a sufficient volume for preparation of the composition therein is provided, while at the same time, the weight of the bottle is reduced to a minimum extent.

The bottle may be formed of a wall structure enabling the expansion and/or retraction of the internal volume of the compartment. The structure can be an expandable and/or retractable. For instance, it can be a concertina wall structure or a stepped wall structure.

The expandable and/or retractable wall structure may constitute at least 50%, preferably at least 75% and more preferably at least 90% of the surface of the outer wall of the compartment.

In a mode, the sealed bottle is expandable from a first retracted position to a second expanded position of the concertina wall structure. In a second mode, the sealed bottle is already in an expanded mode of a retractable wall structure. After use, the volume of the emptied bottle can be reduced into a retracted mode of the wall structure. In particular, the wall structure can be made of a concertina structure, a stepped structure, circumferential lines of weakness or of reduced thickness in the material itself and combinations thereof.

Alternatively, the bottle may comprise an inflatable and/or unfoldable wall structure such as a pouch or bag that is designed to be inflated respectively unfolded upon liquid injection into the pouch. Thereby, the pouch or bag is preferably in a retracted respectively folded position before use respectively provision of liquid to the bottle. After use, the pouch may be brought back into its retracted state in order to occupy a minimum storage volume.

Moreover, the bottle may further comprise a preform constituting a compartment enclosing a predefined minimum volume, the preform being of a plastically and/or elastically deformable material.

The preform may be of a material that interacts with heated liquid provided thereto in order to expand to provide a larger volume. The expansion of the material may result from the contact with heated liquid and the pressure of the liquid on the outer wall structure. Thereby, the neck portion and/or the inlet portion of the bottle are preferably made of a material that does not deformed upon provision of heated liquid thereto. Examples of material can be thin PET or PE polymer.

The term "heated liquid" refers to a liquid having a temperature between 35 to 80° C., more preferably between 55 and 75° C.

The wall structure of the bottle may also be designed to enable manual squeezing of the bottle to force the formula composition out of the bottle after its preparation.

In a preferred embodiment, the bottle further comprises liquid outlet means which are designed to release the aqueous nutritional composition from the inside of the bottle to the exterior thereof. The liquid outlet means are preferably located in the neck portion of the bottle. Thereby, the liquid outlet means may for example be constituted by an aperture or opening in the neck portion of the bottle. In a mode of the invention, the aperture or opening in the neck portion of the bottle may as well serve as the liquid inlet means of the bottle.

The bottle preferably may further comprise a gas-liquid equilibrium means to allow gas, e.g., air or a protective gas contained in the bottle, to leave the compartment as liquid is fed through the filter means in the bottle. In a mode, the gas-liquid equilibrium means may be a one-way valve which is permeable to gas but impermeable to liquid, thereby allowing the exit of gas from the interior of the bottle when water is fed thereto.

Such gas-liquid equilibrium means may, for example, be constituted by a venting membrane connected or integrally formed with the neck portion or a body portion of the bottle to equalize the pressure within the compartment of the bottle when liquid is provided in the bottle.

The gas-liquid equilibrium means may as well be connected or be integrally formed with the filter assembly according to the present invention.

The gas-liquid equilibrium means may be present in the neck portion of the bottle, whereby the liquid inlet means may be present at a portion of the bottle different therefrom, such as e.g. a side-wall portion or a bottom portion of the bottle.

In a preferred embodiment, the liquid inlet means are designed to be connected by an external liquid probe of the liquid dispensing means. Accordingly, provided liquid such as preheated water can be directly fed to the inlet means and thus to the interior of the bottle in order to prepare the nutritional composition.

In a preferred mode, the filter assembly according to the present invention is designed to be selectively removed from the bottle. Thereby, the filter assembly is preferably arranged in the neck portion of the bottle. In particular, the bottle may comprise a disposable wall portion fixedly connected to at least the filter assembly and removably connected to an outer portion or surface of the bottle such as e.g. the neck portion. The disposable wall portion may be a peelable sealing membrane or a sealing collar of the bottle. Therefore, after feeding liquid in the bottle through the filter assembly, the filter assembly can be removed from the bottle before serving to the consumer such as by peeling off the disposable portion.

In another mode, the filter assembly is designed to be permanently connected to the bottle. In such case, the filter assembly may be integrally formed within a body portion of the bottle such as for example a neck portion, or a sidewall or a base (bottom) portion of the bottle.

The filter assembly is preferably arranged to cover at least a portion of an aperture respectively opening provided in the neck portion of the bottle.

The filter assembly comprises a filtering membrane and at least one rigid supporting wall downstream of the membrane. Preferably, the membrane is placed between a rigid upper (i.e. upstream) and lower (i.e. downstream) supporting wall. The micro-porous membrane is arranged to form a barrier to contaminants, in particular, microorganisms such as bacteria. For antimicrobial purpose, the filter membrane has preferably a pore size of less than 0.4 microns, most preferably of less than 0.2 microns. It may have a thickness of less than 500 microns, preferably between 10 and 300 microns. The material of the membrane can be chosen from the list consisting of PES (polyethersulfone), cellulose acetate, cellulose nitrate, polyamide and combinations thereof. Thereby, the outer wall of the filter assembly preferably comprises a liquid inlet and the inner wall comprises a liquid outlet to direct a liquid jet into the compartment of the bottle. The liquid inlet of the filter assembly is preferably designed to be connected to an outlet probe of the liquid dispensing means in order to provide liquid to the filter assembly and thus, to the interior of the bottle.

The filter assembly is preferably designed as a handleable rigid unit to withstand the pressure exerted thereon by liquid fed in the bottle and also to resist to manual mechanical constraints such as squeezing or piercing of the membrane by the outlet probe of the dispensing device.

The filter assembly according to the present invention may be designed as the filter unit described e.g. in WO 2010/128051.

The bottle may further comprise a resealable portion arranged in the flow path of the liquid from the inlet means to the compartment. Thereby, the resealable portion is preferably designed to close-off the flow path between the inlet means and the compartment after provision of liquid by the external liquid dispensing means.

Hence, during feeding of the prepared nutritional formula from the compartment to the exterior of the bottle, e.g. by means of the outlet means, liquid is prevented from bypassing the outlet means of the bottle and thus, the serving of the complete nutritional formula to the human is enabled.

According to a preferred mode, the resealable portion is designed to interact with the disposable portion of the bottle to close-off the flow path from the compartment to the liquid inlet upon removal of the disposable portion. Thereby, the resealable portion may be designed to elastically and/or plastically deform in order to close-off said flow path.

In a preferred embodiment of the invention, the bottle may comprise sealing means for sealing the bottle. Thereby, the sealing means are preferably arranged to cover the liquid inlet and/or outlet means of the bottle to prevent ingress of contaminants before use thereof. Accordingly, a sealed bottle is provided and no bacteria or other undesired particles may be present in the inlet and/or outlet means of the bottle.

In a preferred embodiment, the sealing means of the bottle comprise at least one removable and/or perforable membrane connected to the liquid inlet means and filter assembly of the bottle.

The sealing means may be perforable to enable an external liquid probe to feed liquid through the filter assembly. Accordingly, the filter assembly may be covered by at least a portion of the sealing means and may then be perforated during the injection of liquid into the filter assembly and thus in the compartment of the bottle.

In a preferred embodiment, the outer wall of the filter assembly is preferably covered by a puncturable membrane made of polymer and/or aluminium to enable liquid to be supplied to the filter assembly by means of a liquid outlet probe of the liquid dispensing means.

The sealing means may as well at least partially constitute the disposable portion of the bottle that is removably connected to the bottle in order to remove the filter assembly.

Thereby, at least a portion of the sealing means is preferably fixedly connected to the filter assembly and designed to allow a selective removal of the filter assembly from the bottle after liquid feeding.

Therefore, the sealing means according to the present invention may comprise a first and a second membrane with different respective sealing strength. Thereby, the second membrane is at least partially fixedly connected to the filter assembly. Preferably, the sealing connection of said second membrane and the filter assembly is stronger than the sealing connection between the second membrane and a portion of the bottle, such as for example part of the neck portion of the bottle.

According to such an arrangement, a first sealing membrane may be provided for fully covering an aperture respectively opening of the bottle and thus effectively prevent the ingress of contaminants of the bottle. Thereby, before use of the bottle, said first membrane which is sealed to the neck portion and/or another portion of the bottle may be removed from the bottle by the user, e.g. in order to at least partially open an aperture respectively opening provided in the bottle.

Then, after the injection of preferably heated liquid by means of a dedicated outlet probe of the liquid dispensing means, the user may remove the second membrane from the bottle, thereby also removing the filter assembly from the opening of the bottle. Thus, the cross-sectional area respectively opening in which the filter assembly is provided is increased, thus facilitating the ejection of liquid therefrom.

In a mode, the sealing means comprises a cap portion comprising a recess for receiving the filter assembly and a sealing membrane on top of the cap portion to sealingly cover the filter assembly.

The bottle preferably comprises connection means for receiving feeding means such as a nipple respectively teat assembly. Hence, the user may provide an external teat assembly to the bottle in order to facilitate feeding of the nutritional composition to the consumer. Thereby, the connection means are preferably provided at the neck portion of the bottle.

The teat assembly may be pre-installed onto the neck portion of the bottle. Thereby, additionally provided sealing means such as a cap may seal the teat assembly to the bottle by a sealed tamper-evident connection.

The teat assembly is preferably designed to match with the correspondingly shaped connection means of the neck of the bottle. The connection means may as well be designed to fit a standard teat assembly available on the market. For example, the connection means be formed by a thread or a bayonet assembly.

The bottle may comprise an integrally formed teat assembly that is arranged in fluid communication with the compartment. The teat assembly may be connected to the outlet means or may constitute the outlet means of the bottle. The integrally formed teat assembly may as well be designed to be selectively removable from the bottle.

In a mode, the feeding means and removable cap portion are connected to each other in a sealed manner. For this, the removable cap portion sealingly covers the feeding means such that no dust or contaminant can contaminate the feeding means until the cap portion is effectively removed. A tamper evidence breakable closure means such as a breakable tab can be provided to the cap portion to provide a safety guarantee to the user.

The teat assembly is preferably confined in a retracted position in the adaptor such as by the disposable cap portion. The teat assembly then can be expanded after liquid has been supplied in the compartment and the cap portion is removed. Preferably comprises a flexible teat formed of moulded silicone, elastomer or, resilient and soft plastic.

The connection means of the feeding bottle may as well be formed to be connected to an additional holding means such as an external container having a volume large enough to encompass the compartment of the bottle.

The bottle according to the present invention preferably comprises a reinforcing structure for supporting the filter assembly. Thereby the reinforcing structure may be a recession or protrusion formed within the bottle. Moreover, the reinforcing structure may be a T-shaped, an X-shaped or a Y-shaped support which is provided in the flow path from the filter assembly to the compartment.

The reinforcing structure is preferably designed to support the filter assembly against pressure and/or force supplied from the exterior thereon. Moreover, the reinforcing structure is preferably positioned to abut or be integral with the filter assembly and to prevent a displacement of the filter assembly towards the compartment.

The bottle may further comprise holding means designed to match with an additionally provided bottle connector for connecting the bottle to a liquid dispensing means.

The additionally provided bottle connector is preferably designed with an internal passage for receiving the bottle and holding the bottle for insertion in a dispenser of pressurized water. The holding means can be one or more portions of wall protruding transversally from the body or neck portion of the bottle.

In another aspect, the present invention relates to a beverage production system comprising a bottle according to the invention and a liquid dispensing means having connection means for connecting to at least a portion of the bottle and outlet means such as an outlet probe for supplying liquid to the bottle.

Moreover, the liquid dispensing means preferably further comprise means designed to open a sealing membrane of the filter assembly of the bottle.

According to the invention, a fully integrated system for preparation of nutritional composition such as infant formula is provided in which the cleaning and sterilizing step of the components necessary to prepare the formula is omitted.

Hence, a fully convenient solution is provided to the user from start to end.

BRIEF DESCRIPTION OF THE FIGURES

FIGS. 13a to 13c are perspective side views relating to the embodiment according to FIG. 11a before use, after removal of the filter unit and after expansion of the teat assembly.

FIG. 14b is a sectional side view of the embodiment according to FIG. 14a.

DETAILED DESCRIPTION OF EMBODIMENTS

Figure 1:
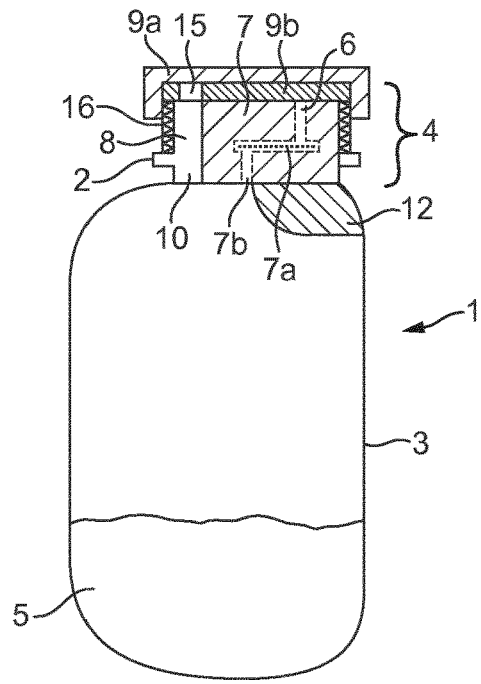
FIG. 1 is a schematic drawing of a preferred embodiment of the bottle according to the invention, wherein the filter assembly is provided in a neck portion of the bottle.

FIG. 1 shows a sectional side view of a preferred embodiment of a bottle according to the present invention.

The feeding bottle 1 comprises a compartment 3 enclosing a predefined portion of powdered or concentrated nutritional formula base 5. Thereby, the nutritional formula base 5 may be of any particular state such as liquid, a jellified, pasty, powdered or granular, for example, wherein said nutritional formula base 5 is suitable for preparation of an aqueous nutritional composition such as an infant formula in combination with the supplied liquid.

The bottle 1 further comprises a neck portion 4. The neck portion may be arranged concentrically to the primary longitudinal axis of extension of the bottle or may be offset and parallel relative to such axis.

The bottle 1 further comprises sealing means 9a,9b. The sealing means 9a, 9b preferably comprise a sealing membrane and/or a provided cap which prevent the ingress of the contaminants into the bottle. The sealing means preferably comprise an inner sealing membrane 9b which is preferably at least partially fixedly connected to a filter assembly 7 of the bottle. The sealing means further comprise an outer sealing membrane or cap 9a which is preferably sealed to the neck portion 4 and/or a body portion of the bottle 1. In addition, the outer sealing means 9a, such as a sealing membrane or cap, may as well be sealed to the inner sealing means 9b in a manner to enable a facilitated removal of the outer sealing means 9a by manual pulling force of a consumer.

The neck portion 4 preferably comprises an aperture 10. Therein, the preferably rigid filter assembly 7 is removably arranged as will be further described with reference to FIGS. 7a to 7c below.

Figure 6:
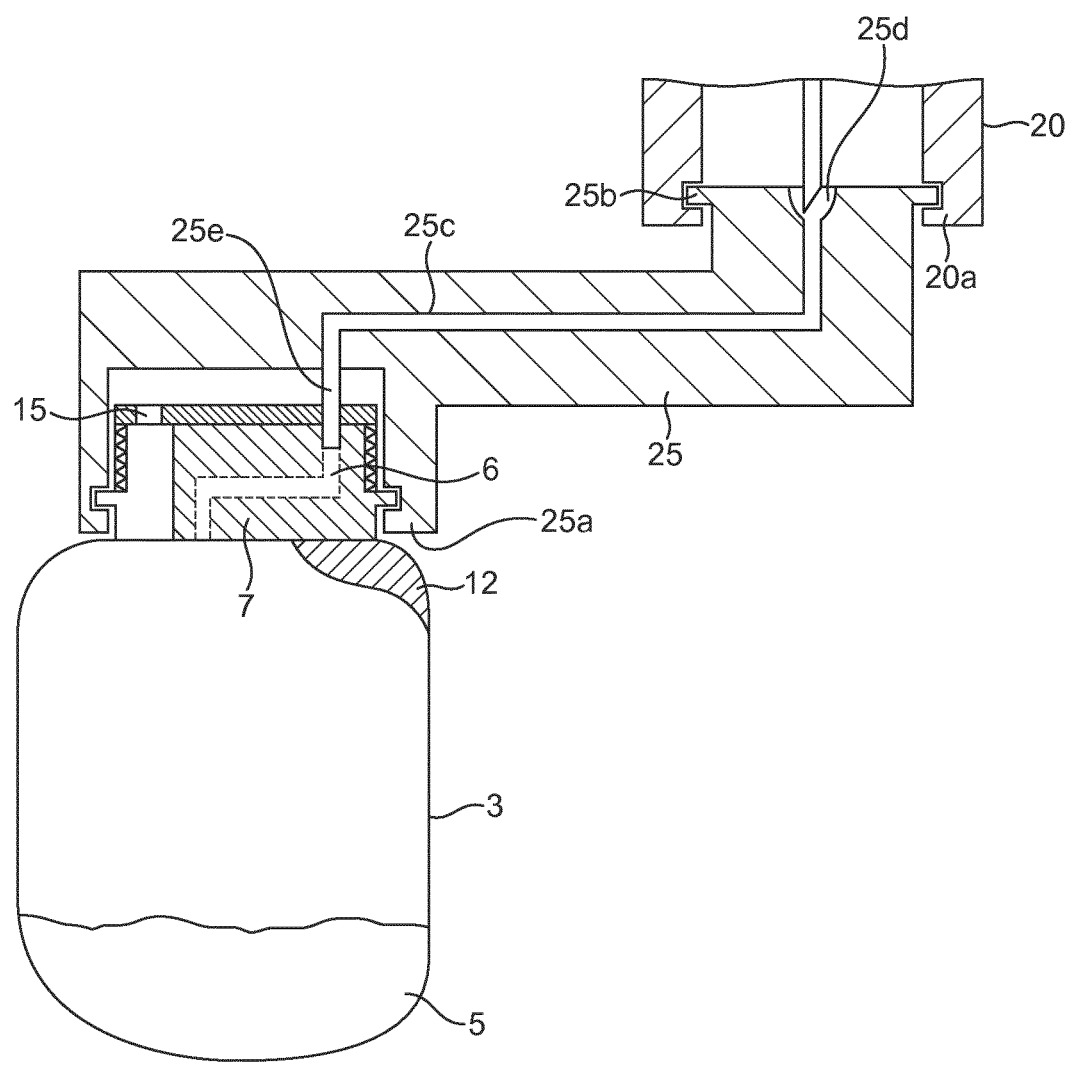
FIG. 6 is a schematic drawing showing a sectional side view of a preferred embodiment of the system according to the present invention wherein the bottle is connected to the water dispensing means by means of a connecting adaptor.

The filter assembly 7 is in connection or comprises a liquid inlet 6 suitable for being connected by a specifically designed liquid probe 11 of a dedicated liquid dispensing means 20 (FIG. 6).

The filter assembly 7 further comprise a filter membrane 7a and a liquid outlet 7b which connects the liquid inlet 6 to the compartment 3 of the bottle 1. The filter membrane 7a is preferably a micro-porous membrane designed for removing contaminants present in liquid provided to the filter assembly 7. The filter membrane 7a is situated across the liquid flow path between the inlet 6 and the outlet 7b so that liquid has no other choice than to traverse the filter membrane 7a.

The liquid inlet 6 is preferably sealed by the inner sealing means respectively the inner sealing membrane 9b sealed to the filter assembly 7. The liquid inlet 6 may however also be sealed by means of a piercable material respectively sealing means integrally formed with the filter assembly 7, such as e.g. plastic material designed to be pierced by on outlet probe 11 of a dedicated liquid dispensing means 20.

The filter assembly 7 is preferably held within the neck portion of the bottle 4 by means of provided supporting means 12. The supporting means 12 may be any structure integrally formed or provided within the bottle 1 in order to enable a pressure resistant support of the filter assembly 7 within the neck portion 4 or a body portion of the bottle 1.

The supporting means 12 is preferably at least one protrusion and/or at least one recession integrally formed within the neck portion 4 and/or a body portion of the bottle 1 and is designed to stably hold the filter assembly 7 in its predefined position.

The bottle 1 further comprises outlet means 8 which enable the ejection of liquid nutritional formula after the preparation from the bottle 1 to the exterior thereof. Thereby, the outlet means 8 can be constituted by at least a part of the aperture 10 formed in the neck portion 4 of the bottle 1.

According to the embodiment of FIG. 1, the outlet respectively the aperture 10 in the neck portion 4 of the bottle 1 is not fully covered respectively closed-off by means of the filter assembly 7 and thus, during the injection of the liquid to the interior of the compartment 3, air may be removed from the compartment 3. For this purpose, the inner sealing means respectively sealing membrane 9b comprises a venting opening 15 which allows the venting of the compartment 3 after the outer sealing means 9a have been removed from the bottle 1. Accordingly, liquid can be effectively provided in the compartment 3 through the liquid inlet and filter assembly 7.

As an alternative, the filter assembly 7 may have integrally formed gas-liquid equilibrium means such as for example a venting opening. Said integrally formed venting opening may be sealed by sealing means 9a,9b. Thereby, the venting opening may be opened by a user, e.g. by removing the sealing means 9a,9b or by dedicated opening means provided at a liquid dispensing means 20 such as a needle.

The bottle 1 further comprises connection means 2 which are designed to enable a connection of the bottle 1 to a dedicated liquid dispensing means 20 of a liquid dispensing machine. The connection means 2 may be at least one protrusion and/or recession formed in the neck portion 4 and/or the body portion of the bottle 1.

Preferably, the connection means 2 are protruding or recessing perpendicular to a longitudinal axis of the bottle 1.

The bottle 1 preferably comprises slanted interior walls in order to guide all of the enclosed ingredients respectively nutritional composition 5 towards the outlet means 8 of the bottle 1 when feeding to the consumer.

Figure 2:
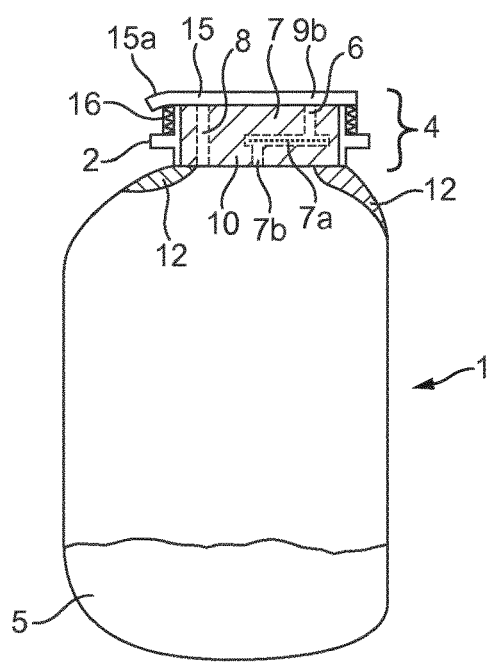
FIG. 2 is a schematic drawing of another preferred embodiment of the invention, wherein the filter assembly is provided in the neck portion, thereby occupying an opening provided in the neck portion.

FIG. 2 shows a sectional side view of another preferred embodiment of the bottle 1 according to the invention. Thereby, the filter assembly 7 fully covers the aperture 10 provided in the neck portion 4 of the bottle 1. As shown in FIG. 2, the filter assembly 7 comprises a liquid inlet 6 designed to be connected by an outlet probe 11 of the dedicated liquid dispensing means 20.

In addition, the filter assembly 7 comprises an integrally formed gas-liquid equilibrium means 8, such as for example a vent or air outlet channel or a valve, in order to allow air to exit the compartment 3 during filling of the compartment with liquid provided from the water dispensing means 20. Therefore, the inner membrane 9b comprises a gas-liquid equilibrium means such as a venting aperture 15 which connects the gas-liquid equilibrium means 8 of the filter assembly to the exterior of the bottle 1. It is to be noted that FIG. 2 refers to a state of the bottle 1, wherein the outer membrane 9a has already been removed by the user.

The inner membrane 9b may comprise a protruding lip or tab 15a in order to facilitate removal of the inner membrane or cap 9b from the bottle 1. The inner membrane 9b is perforable by a probe of the water dispensing means through the liquid inlet 6.

As can be further seen in FIG. 2, the bottle 1 may comprise circumferentially formed supporting means 12 at the inner surface of the bottle 1 in order to support the filter assembly 7 in the neck portion 4. In particular, the supporting means 12 are designed to prevent the filter assembly 7 from moving, more particularly deflecting, in the direction of the compartment 3 by effect of the hydraulic pressure of liquid on the filter or by a physical pressure such as during transport or handling.

Figure 3:
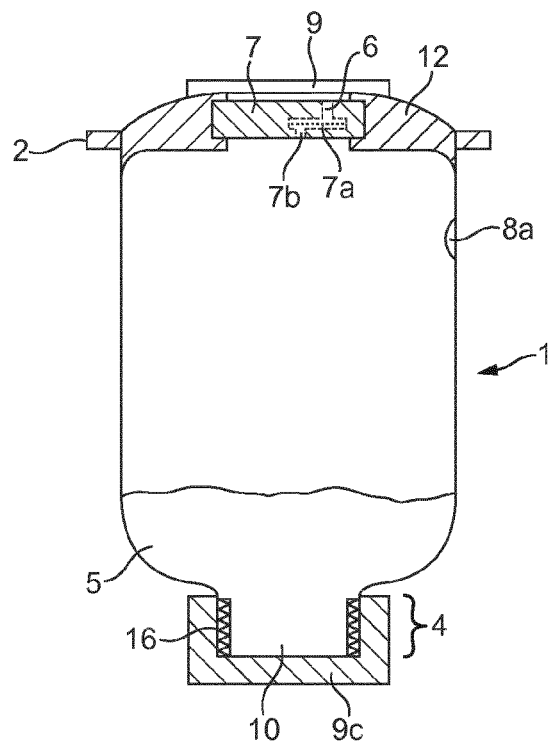
FIG. 3 is a schematic drawing of another preferred embodiment according to the invention, wherein the filter is provided in a bottom portion of the bottle.

FIG. 3 shows a sectional side view of another preferred embodiment of the bottle 1 according to the present invention, wherein the filter assembly 7 is provided at a body portion of the compartment 3. In particular, the filter assembly 7 is preferably arranged at a bottom portion of the compartment 3.

Thereby, the filter assembly 7 is fixedly connected to the compartment 3 by supporting means 12 and sealed with a sealing membrane 9 connected to the filter assembly 7 and/or the outer surface of the compartment 3.

As can be seen in the figure, the connection means 2 provided at the bottle 1 are arranged at the circumference of the bottom portion of the compartment 3.

In addition, the bottle 1 comprises a liquid outlet 10 formed in a neck portion. Thereby, the neck portion 4 is preferably arranged at a side opposite to the bottom of the compartment 3, in which the filter assembly 7 is arranged.

The liquid outlet 10 is preferably an aperture or an opening suitable for evacuating a liquid composition prepared by injecting liquid through the filter assembly 7 into the bottle 1. Thereby, the liquid outlet 10 is preferably covered by a membrane 9c which is sealed to the outer edges of the neck portion 4 and/or the body portion of the compartment 3. The sealing means 9c may as well be a cap provided to the neck portion 4, e.g. by means of a screw closure which interacts with a screw thread 16 provided at the circumference of the neck portion 4 or a combination of a membrane and a cap.

According to said embodiment, the filter assembly 7 may comprise integrally formed gas-liquid equilibrium means such as a vent or air ejection means or a valve (not shown) in order to enable the air to be withdrawn from the compartment 3 during the liquid filling thereof.

As an alternative, the bottle may as well comprise additionally provided gas-liquid equilibrium means 8a which are arranged in the bottom or side wall portion of the compartment 3 and which are designed to enable the ejection of air but the retention of liquid.

Thereby, the additionally provided gas-liquid equilibrium means 8a may comprise an air valve or may be an air permeable/water impermeable membrane.

In addition to the facilitated provision of liquid into the compartment 3, the gas-liquid equilibrium means 8a further facilitate the ejection of liquid from the bottle 1 during feeding of the nutritional composition to the consumer as air can be provided to the interior of the compartment 3 during liquid ejection from the compartment.

The gas-liquid equilibrium means 8a may be arranged at a specific distance receptively height from neck portion 4. Accordingly, the amount of liquid which is provided to the interior of the compartment 3 may be limited. Thereby, when the level of liquid inside the bottle 1 has reached the position of the vent means 8a, no further air can be ejected and thus, pressure within the bottle 1 rises. Thereby, the liquid dispensing means 20 may be designed to stop the provision of liquid after a certain pressure is reached within the compartment 3.

Accordingly, the amount of liquid provided in the compartment 3 can be predefined and thus a reproducible ratio of liquid to nutritional ingredients provided in the bottle 1 is obtainable. Thus, a user is prevented from providing the wrong amount of liquid to the compartment 3.

Figure 4:
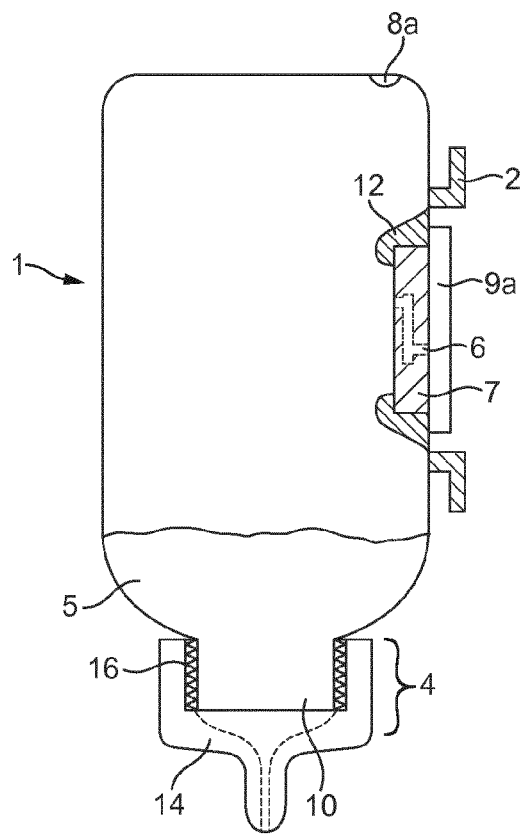
FIG. 4 is a schematic drawing of another preferred embodiment of the invention, wherein the filter assembly is provided in a side wall portion of the bottle.

The embodiment according to FIG. 4 shows a sectional side view of another preferred embodiment of the invention, wherein the filter assembly 7 is provided in a sidewall portion of the compartment 3. Thereby, the filter assembly 7 is covered by an outer sealing membrane 9a which is connected to the filter assembly 7 and/or the outer surface of the compartment 3.

The sealing membrane 9a is preferably a puncturable respectively piercable membrane such that an outlet probe 11 or specifically provided opening means 22 of the dedicated liquid dispensing means 20 may pierce through said membrane 9a in order to contact the filter assembly 7 and more specifically to contact the inlet 6 of the filter assembly 7.

The filter assembly 7 is preferably fixedly connected to the sidewall of the bottle 1. Thereby, the sidewall portion of the bottle 1 comprises supporting means 12 for the filter assembly 7.

The bottle 1 may further comprise gas-liquid equilibrium means 8a which are arranged within a bottom portion of the compartment 3 opposite to the teat assembly.

As can be seen in FIG. 4, feeding means such as a teat assembly 14 which may be provided as an additional part can be connected to the neck portion 4. Thereby, the teat assembly 14 may comprise integrally formed connection means which are designed to be connected to correspondingly formed connection means, such as the screw thread 16 provided at the circumference of the neck portion 4.

The teat assembly 14 may be prearranged on the bottle 1 or may be supplied as an additional part which the user may connect to the bottle 4, e.g. after removing the membrane or sealing cap 9c as shown in FIG. 3.

Figure 5:
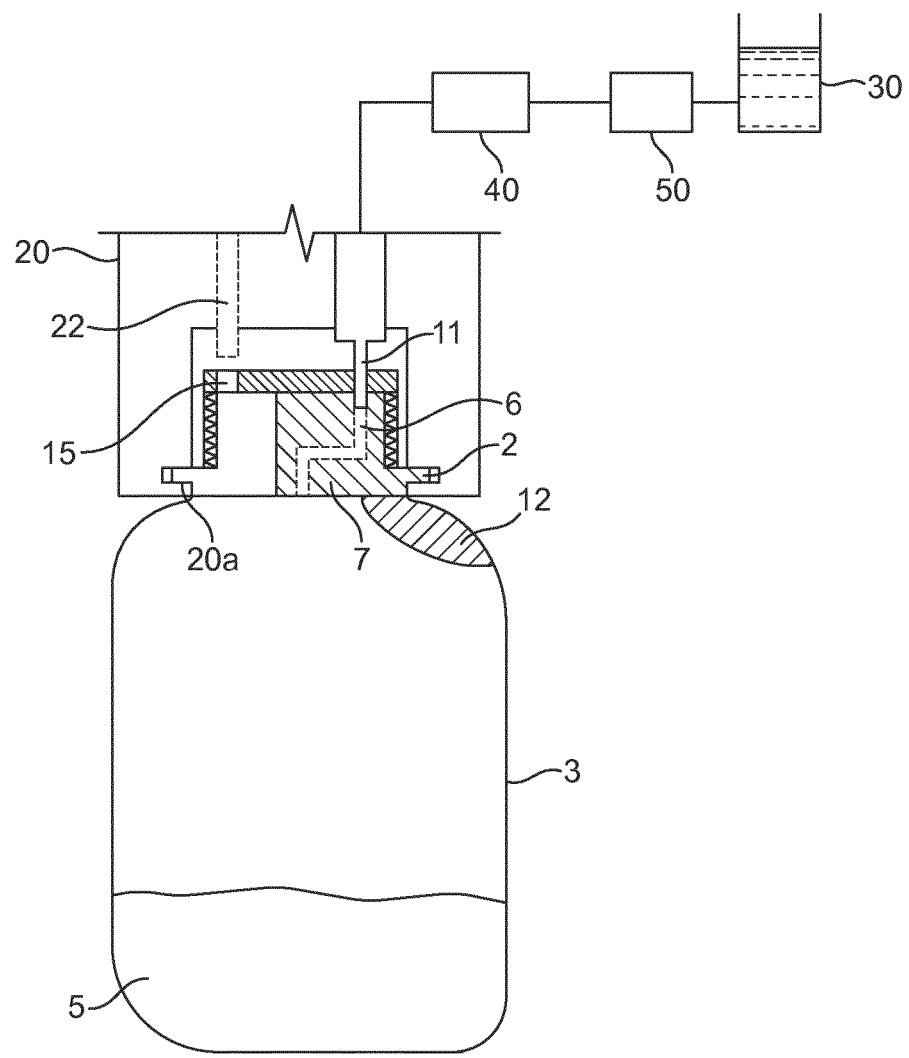
FIG. 5 is a schematic drawing of a system according to the present invention, wherein the bottle is connected to a liquid dispensing means.

FIG. 5 shows a schematic drawing of the system according to the present invention comprising liquid dispensing means 20 and a bottle 1 connected thereto.

The liquid dispensing means 20 preferably comprise a water reservoir 30, a pump 40 and a heater 50 suitable for heating the liquid provided by means of the liquid supply in a continuous flow.

The liquid dispensing means 20 preferably further comprise connection means 20a designed for connecting the connection means 2 of the bottle 1 to the liquid dispensing means 20.

Moreover, the liquid dispensing means 20 comprise an outlet probe 11 which is designed to connect to the inlet 6 of the filter assembly 7 of the bottle 1.

In addition, if the membrane 9b does not already comprise a vent opening (such opening 15), the liquid dispensing means 20 may optionally comprise opening means 22 which are designed to open the membrane 9b in order to to create an opening and consequently allow venting of the compartment 3 during liquid injection thereof. Moreover, the opening means 22 may be integrally formed with the outlet probe 11 in order to open the membrane 9b. The opening means 22 may be a protruding tubular hollow member with a perforating free end, for example. The outlet probe 11 and/or the opening means 22 are preferably movable relative to the connection means 20a of the dispensing means 20.

After opening of the membrane 9b by means of the outlet probe 11 and/or the opening means 22, liquid may be injected into the compartment 3 of the bottle 1. Thereby, a user of the liquid dispensing means 20 may control the amount of liquid provided into the bottle 1 e.g. by means of a dedicated control means (not shown) connected at least to the pump 40 of the water dispensing means 20.

FIG. 6 relates to another preferred embodiment according to the present invention, wherein the system further comprises a bottle connector 25 which is designed to act as an interface between the liquid dispensing means 20 and the bottle 1. Thereby, the bottle connector preferably comprises connecting means 25a for connecting to the neck portion 4 and/or the connecting means 2 of the bottle 1, as well as connecting means 25b being designed to connect the bottle connector to the water dispensing means 20. For example, the bottle connector may form a drawer insertable in the liquid dispensing means.

The bottle connector 25 preferably comprises an integrally formed liquid path 25c connecting an inlet adapter 25d at an inlet portion of the bottle connector to an outlet probe 25e at an outlet portion thereof. Thereby, the inlet adapter 25d is designed to be connected to the outlet probe 11 of the liquid dispensing means 20. The outlet probe 25e is designed to be connected to the liquid inlet means 6 of the bottle 1.

Figure 7A:
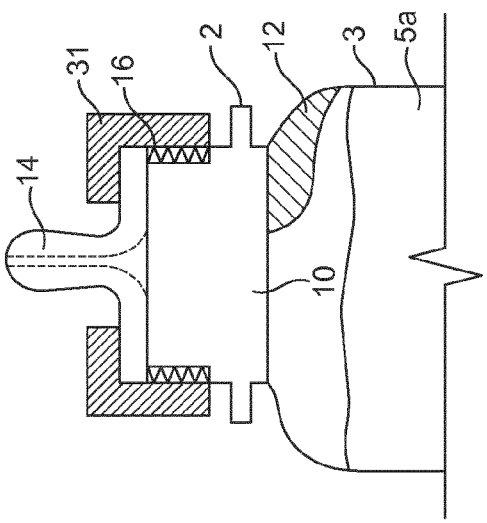
FIG. 7a is a schematic drawing showing a perspective top view of the embodiment according to FIG. 1.

FIG. 7a shows a perspective top view onto the neck portion 4 of the bottle 1 from which the (optional) outer sealing membrane 9a has been removed by the user.

The bottle 1 is at least partially opened by means of removing the first membrane 9a or cap sealed to the outer portion of the second sealing membrane 9b and/or the neck portion 4 of the bottle 1. Thereby, an outlet aperture 15 or valve which is preferably provided within the membrane 9b is laid open and which allows venting of the bottle 1 during liquid injection thereto.

The liquid inlet 6 is preferably still covered (i.e., closed) by the inner membrane 9b and is opened upon contact with the outlet probe 11 of the liquid dispensing means 20.

Figure 7B:
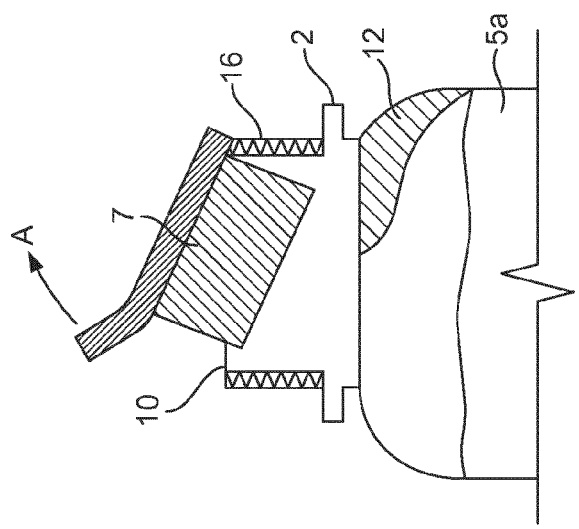
FIG. 7b is a schematic drawing of the embodiment according to FIG. 7a, wherein the filter assembly is removed by means of the provided second sealing membrane.

After the injection of liquid into the compartment 3 by means of the outlet probe 11 being connected to the filter assembly 7, the filter assembly 7 may be removed from the bottle 1 by tearing the second membrane 9b constituting a disposable portion of the bottle as shown in FIG. 7b. Thereby, the sealing between the second membrane 9b and the neck portion 27 of the bottle 1 is weaker than the sealing connection between the second sealing membrane 9b and the filter assembly 7.

By means of the removing of the filter assembly 7, a liquid outlet 10 of increased cross-sectional area is provided which enables to facilitate the removal of the complete liquid nutritional composition 5a from the compartment 3.

Figure 7C:
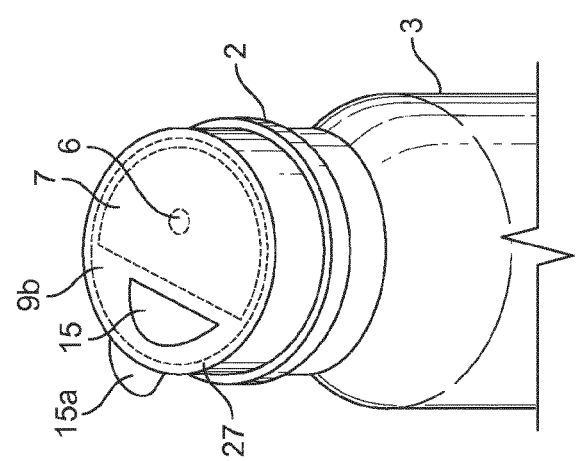
FIG. 7c is a schematic drawing of the embodiment according to FIGS. 7a and 7b, wherein an additionally provided teat (nipple) assembly has been attached onto the bottle.

Before the withdrawal of the nutritional composition 5a, a feeding means such as a teat assembly 14 may be provided to the neck portion 4. As can be seen in FIG. 7c, the teat assembly 4 may be connected for example by means of a dedicated connection means such as a cap nut 31 which interacts with the provided screw thread 16 at the circumference of the neck portion 4. Thereby, the teat assembly 14 can be a standard teat assembly available on the market.

Figure 8A:
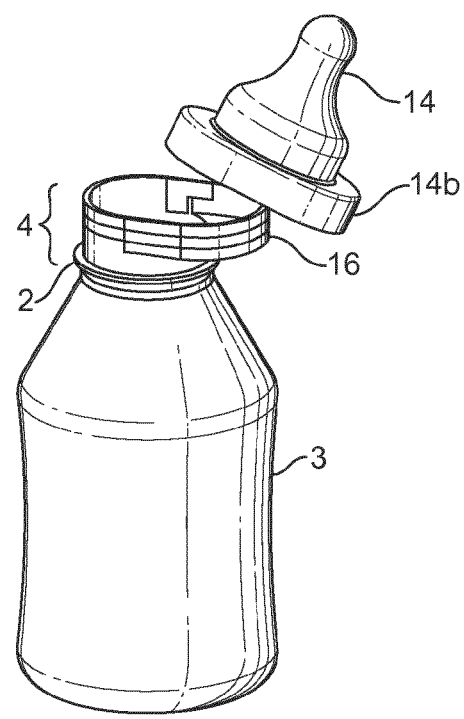
FIGS. 8a and 8b shows a perspective side view of another preferred embodiment of the bottle, wherein the connection means are specifically formed to match a correspondingly shaped teat assembly.
Figure 8B:
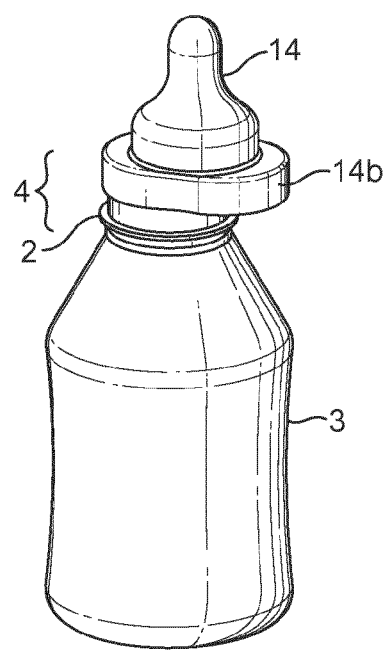

The teat assembly 14 may as well be specifically designed in order to match a correspondingly shaped connection means 16 as shown in FIGS. 8a and 8b.

In particular, the teat assembly 14 may comprise a protruding connection skirt 14b of varying geometrical form, such as e.g. oval-shaped, and which may be connected onto the correspondingly shaped connection means 16.

Figure 9A:
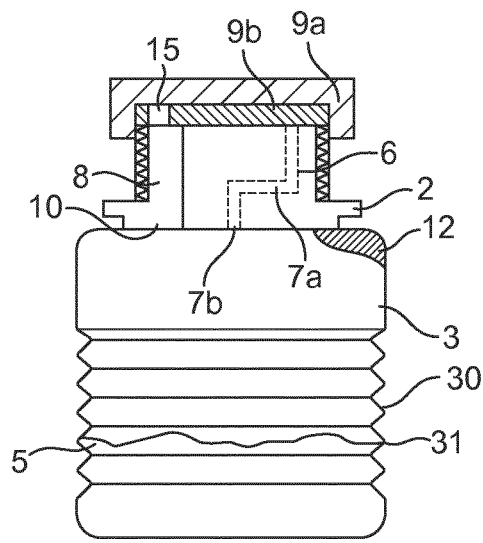
FIG. 9a is a schematic drawing of another preferred embodiment of the bottle having an expendable and/or retractable wall structure, wherein the bottle is in a retracted state.
Figure 9B:
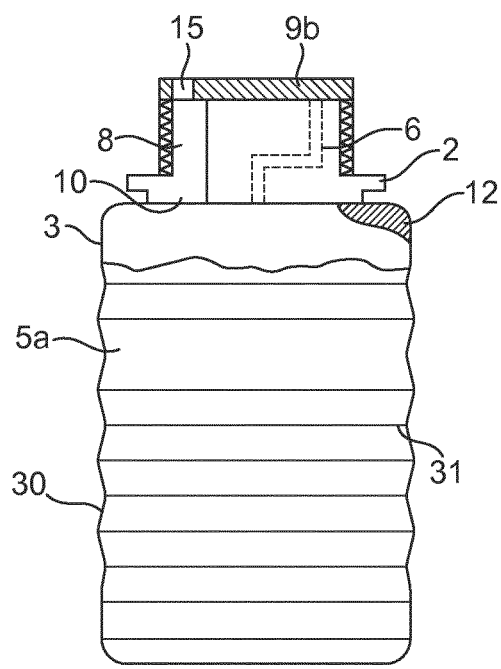
FIG. 9b is a schematic drawing of the bottle according to FIG. 9a, wherein the bottle is in an expanded state.

FIGS. 9a and 9b relate to another preferred embodiment of the bottle 1 according to the present invention, wherein the bottle 1 is designed as being expandable and/or retractable. Thereby, the storage volume of the compartment 3 enclosed by an outer wall 30 of the bottle 1 is designed to be variable.

The bottle 1 preferably comprises an expandable and/or retractable portion 31 integrally formed with the outer wall 30 of the compartment 3. The expandable and/or retractable portion 31 may be a concertina-like structure having a plurality of recesses and/or protrusions arranged about the circumference of the compartment 3.

Before being used, the bottle 1 is in its retracted state as shown in FIG. 9a. Thereby, the concertina-type portion 31 of the outer wall 30 is folded together in order to occupy a minimum storing space, but at the same time provide a sufficient volume for a pre-metered amount of the powdered or concentrated nutritional formula base 5 within compartment 3 of the bottle 1.

The concertina-type portion 31 of the bottle 1 may then be expanded as shown in FIG. 9b either manually or by the liquid filling the bottle 1 during liquid provision thereto. Accordingly, a ready-to-use bottle with suitable volume for the nutritional composition 5a to be prepared is provided.

In this expanded state of the bottle 1, the expandable and/or retractable portion 31 preferably enables a manual squeezing of the bottle 1 in order to force the nutritional composition 5a out of the bottle 1 after its preparation.

After use of the bottle 1, the expandable and/or retractable portion 31 may be retracted manually to a reduced volume, thus occupying a minimum storage space of the used bottle.

In another preferred mode, the sealed bottle 1 is already in an expanded state before liquid provision to the bottle 1. Then, after use of the bottle, the user may reduce the volume of the compartment 3 by compressing respectively retracting the expandable and/or retractable portion 31.

It is to be noted that the expandable and/or retractable portion 31 may as well comprise a stepped structure, circumferential lines of weakness or a reduced thickness in the material of the outer wall 30 of the bottle 1.

Figure 10A:
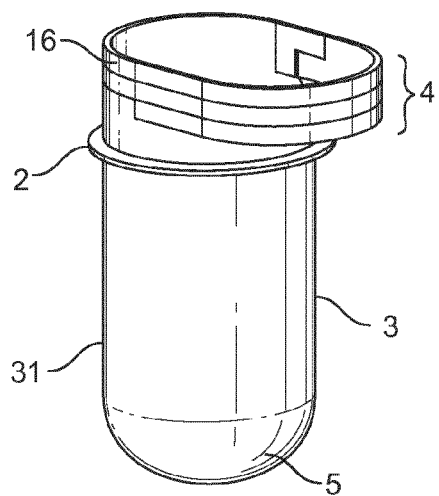
FIG. 10a is a schematic drawing of another preferred embodiment of the bottle, wherein the compartment is an expandable preform in its initial state.
Figure 10B:
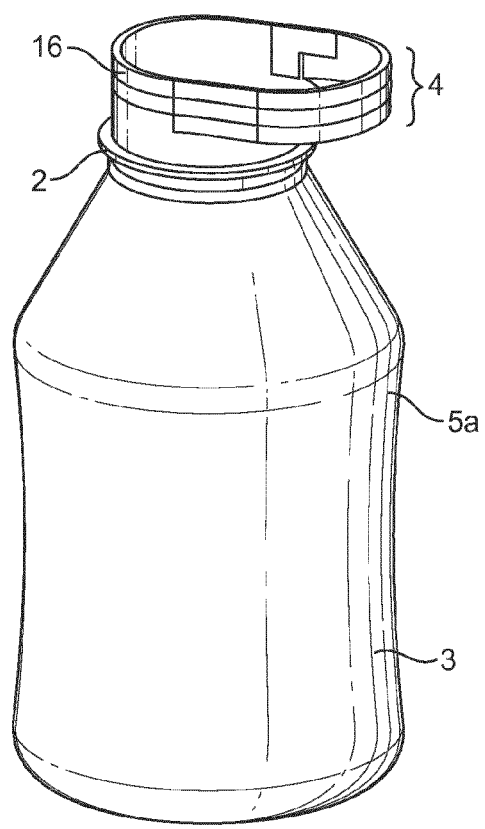
FIG. 10b is a schematic drawing of the embodiment according to FIG. 10a, wherein the compartment is in its expanded state.

FIGS. 10a and 10b relate to another embodiment of the bottle 1, wherein the bottle is made from a perform. The feeding bottle of the invention is manufactured by injection moulding starting from a perform that has the shape of a test tube, the open end of which, in particular, the connection means 2 and neck portion 4, has already the dimensions and the definitive shape of the final bottle. The perform of FIG. 10a is reheated, then stretched longitudinally by means of a stretching shaft or rod and blown in a mould by introducing pressurized air inside the perform. The final bottle (FIG. 10b) may be given very thin walls such as walls having a thickness below 130 microns, preferably comprised between 45 and 100 microns.

The preform 3 is preferably made of a thermoplastic polymer, preferably polyester such as PET or PE. The neck portion 4 and/or the connection means 2 can be made of the same or a different material but is more rigid to be not deformed compared to the perform 3.

Figure 11A:
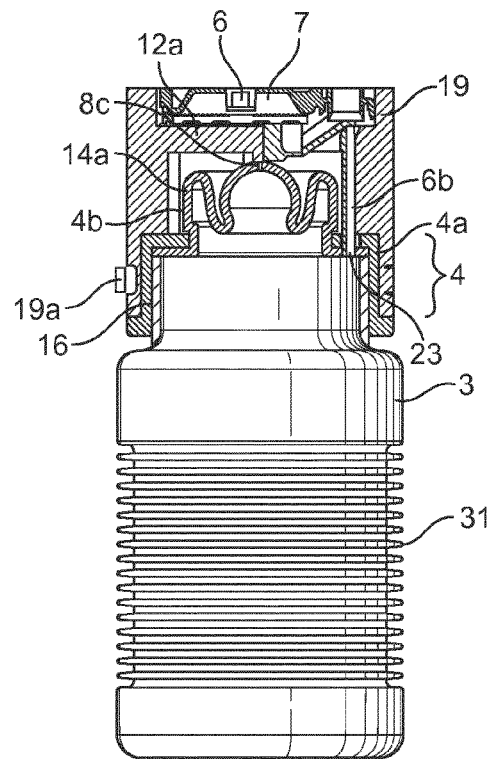
FIG. 11a is a sectional side view of another preferred embodiment of the bottle, wherein the bottle comprises a teat assembly.

FIG. 11a relates to another preferred embodiment of the bottle 1, wherein the bottle 1 comprises feeding means 14a sealingly protected a removable cap portion.

The bottle 1 comprises a disposable cap portion 19 that is connected to the neck portion 4 of the bottle 1. Thereby, the disposable cap portion 19 forms preferably a sealing collar connected to an annular portion 4a of the neck portion 4. The disposable cap portion 19 is preferably secured to the neck portion 4, e.g. by means of a tamper evidence latch member 19a.

The filter assembly 7 is preferably fixedly connected to the disposable cap portion 19 which holds the filter assembly 7 in position above the integrally formed feeding means 14a by means of integrally formed reinforcement structure 12a.

The feeding means 14a is preferably a teat assembly which is connected to an inner surface 4b of the neck portion 4, thereby preferably fully closing-off the opening 10 of the neck portion 4.

The integrally formed feeding means 14a are preferably in a compressed respectively retracted state when the disposable cap portion 19 is connected to the neck portion 4. Thereby, the disposable cap portion 19 preferably at least partially covers the opening 10 in order to hold the feeding means 14a in a retracted state as shown in FIG. 11a.

The feeding means 14a preferably constitute the outlet means of the bottle 1. Thereby, the feeding means 14a comprise an outlet 8c providing an additional outlet flow path from the compartment 3 to the exterior of the bottle 1 when liquid is dispensed from the compartment 3.

The outlet 8c preferably also serves as a venting means in order to enable gas provided within the compartment 3 to exit the compartment 3 during provision of liquid thereto by means of the bottle 1.

The flow path from the inlet means 6 to the compartment 3 is preferably arranged in parallel to the additional outlet flow path between the compartment 3 and the outlet 8c. The cap portion may also be provided with a vent opening (not shown).

Thereby, the disposable portion 19 preferably comprises an integrally formed liquid channel 6b in fluidic communication between the filter assembly 7 and the compartment 3 in order to constitute an inlet flow path for supplying liquid to the compartment 3.

The bottle 1 further comprises a resealable portion 23 that is preferably arranged in the inlet flow path from the inlet 6 to the compartment 3.

The resealable means 23 is preferably formed by a tubular portion of the cap portion 19 holding open a resealable portion made of elastically deformable material comprising an aperture. In particular, the aperture of the resealable portion is held open by the tubular portion when the portion is inserted into the aperture and the aperture closes-off when the tubular portion is removed from the aperture such as when the cap portion 19 is removed from the body portion 17 of the cap. Thereby, the resealable portion 23 is preferably integrally formed with the feeding assembly respectively teat 14a connected to the body portion 17. The resealable portion may be formed on the border of the teat with the aperture traversing the border. The teat 14a can, for instance, be formed of moulded silicone, elastomer or resilient and soft plastic.

The feeding bottle 1 of FIG. 11a can form a fully sealed container containing a predefined amount of powdered or concentrated liquid nutritional formula base therein. For this, a perforable or removable sealing membrane 9a covers the filter assembly and liquid inlet 6. After removal or perforation of the sealing membrane, the container is filled with liquid supplied by external liquid dispensing means. Liquid entering the liquid inlet 6 is filtered through the filter assembly 7 so that the undesired contaminants are removed before reaching the liquid channel 6b and being dispensed in the product compartment 3. After thorough mixture of the liquid with the nutritional formula base, the cap portion 19 can be removed causing the removal of the filter assembly and the deployment of the teat 14a. Before removing the cap portion, the thorough mixture can be completed by manually shaking the container if necessary. The presence of the cap portion prevents liquid from splashing during shaking. After removal of the cap portion, the nutritional composition is ready to be served. After feeding to the person with the nutritional composition, the feeding bottle can be discarded.

Figure 11B:
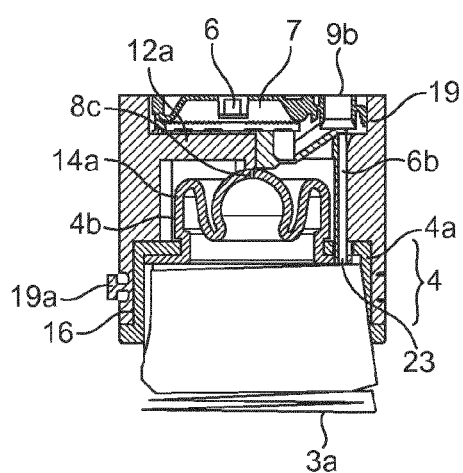
FIG. 11b is a sectional side view of the embodiment according to FIG. 11a, wherein the compartment is an unfoldable pouch or bag.

FIG. 11b relates to a feeding bottle 1 according to FIG. 11a, with the difference that the compartment 3 is constituted fully or partially by an unfoldable pouch or bag. Thereby, the compartment preferably comprises at least an unfoldable bottom portion 3a which is designed to be inflated and/or unfolded upon provision of liquid thereto.

Figure 11C:
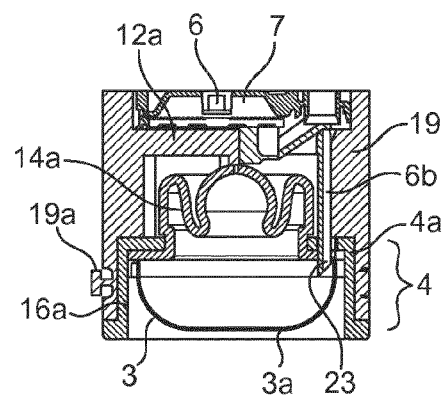
FIG. 11c is a sectional side view of another preferred embodiment of the bottle, wherein the compartment is an expandable or inflatable bag.

FIG. 11c relates to the bottle according to FIGS. 11a and 11b, wherein the compartment 3 is an expandable or inflatable bag.

The inflatable compartment 3 according to this embodiment preferably has an initial bowl-shaped form. The annular neck portion 4 is preferably protruding in direction of the bottom portion 3a of the compartment 3 in order to fully cover the outer circumference of the compartment 3.

Figure 12C:
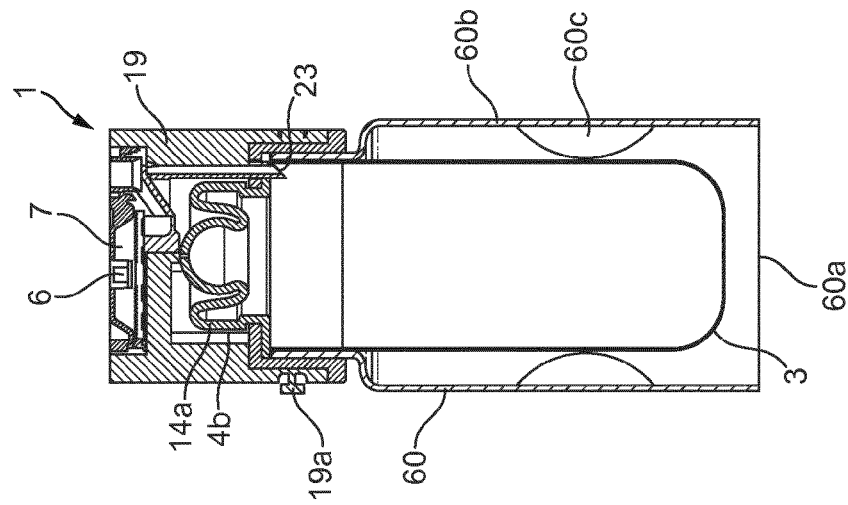
FIGS. 12b and 12c are sectional side views of the embodiment according to FIG. 12a, which relate to the bottle before and after provision of liquid into the compartment.
Figure 12B:
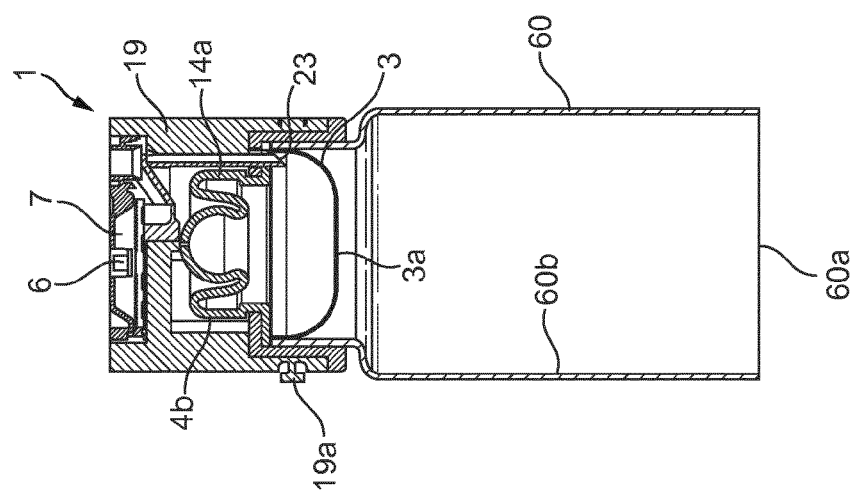
Figure 12A:
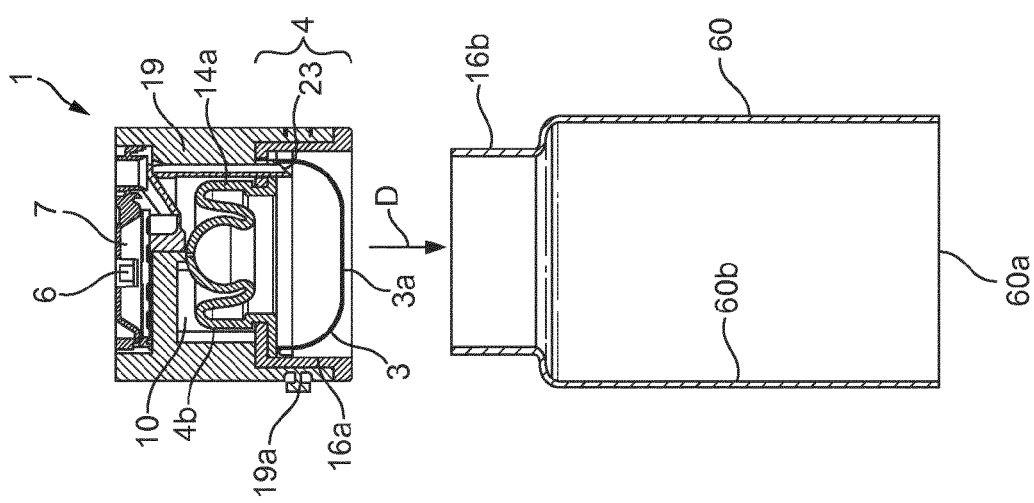
FIG. 12a is a sectional side view of the embodiment according to FIG. 11c, wherein the bottle is connected to an additional external container such as a rigidifying tubular member.

As shown in FIG. 12a, the neck portion 4 of the bottle 1 according to the invention preferably further comprises a connection means 16a which may be arranged on an inner or outer annular surface of the neck portion 4 and which are designed in order to connect the bottle 1 to an additional container 60 (see arrow D) such as e.g. a baby bottle or mere tubular rigidifying member having a volume which large enough to encompass the compartment 3 in its expanded state.

The size and geometric form of the additional container 60 is preferably designed in order to not directly contact an outer surface of the extended compartment 3. Hence, the transmission of heat from the inside of the compartment 3 to the container 60 is effectively prevented by means of the air gap present between container 60 and compartment 3.

Thereby, the container 60 preferably comprises an air venting means such as e.g. a valve or a bottom opening 60a in order to enable the compartment 3 to expand within the container 60.

It is to be understood that the container 60 may as well comprise an inner surface 60b designed to interact with the compartment 3 in order to provide a desired form of the compartment 3 within the container 60 when being expanded. Therefore, the inner surface 60b may for example comprise protrusions and/or recessions 60c to which the expandable compartment 3 may abut when liquid is provided therein, thus providing a compartment 3 of specific shape. Accordingly, for example removal of the liquid from the compartment 3 may be enhanced.

FIGS. 13a to 13c relate to the embodiment of the bottle 1 according to FIG. 11a.

The bottle 1 may be stored in its retracted state as shown in FIG. 13a. Thereby, the concertina-type portion 31 of the outer wall 30 is folded together in order to occupy a minimum storing space, but at the same time provide a sufficient volume for housing the predefined amount of infant formula base.

The concertina-like portion 31 of the bottle 1 may then be expanded as shown in FIG. 13b either manually or by the liquid filling the bottle 1 during liquid provision thereto.

After the provision of liquid into the bottle 3, the disposable portion 19 is removed from the neck portion 4 by removing and/or pulling the securing latch member 19a.

The teat assembly 14a that is preferably arranged within the bottle 1 in a retracted state may then brought into an expanded state manually, e.g. by squeezing the bottle 1 (see FIG. 13c).

Figure 14A:
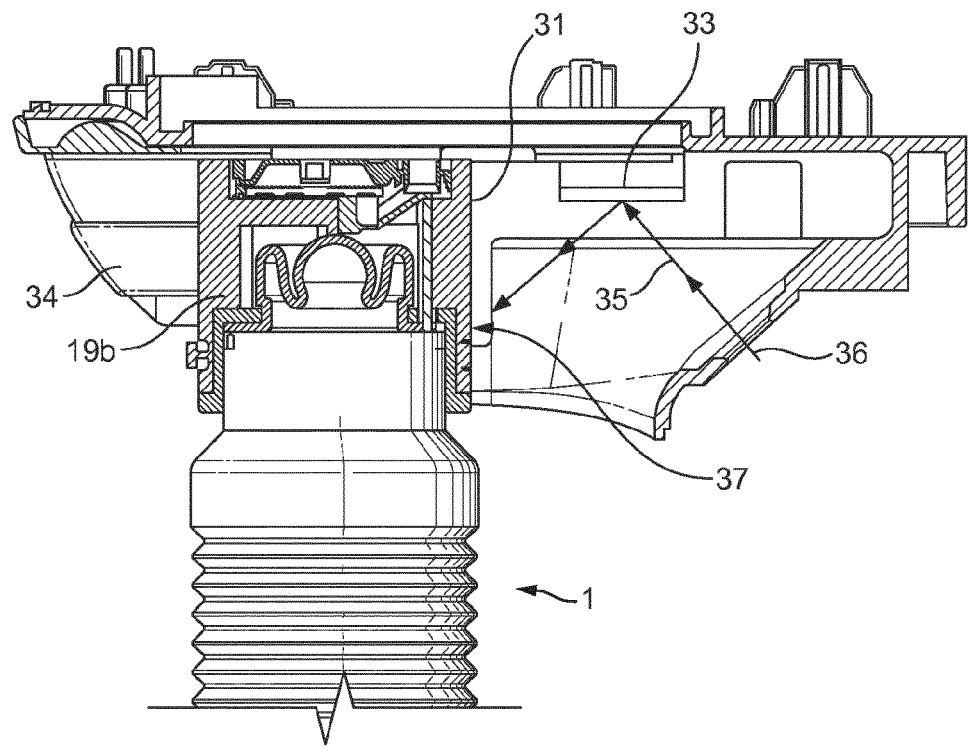
FIG. 14a is a sectional side view of the embodiment according to FIG. 11a, wherein the bottle is connected to the bottle connector of the liquid dispensing means.
Figure 14B:
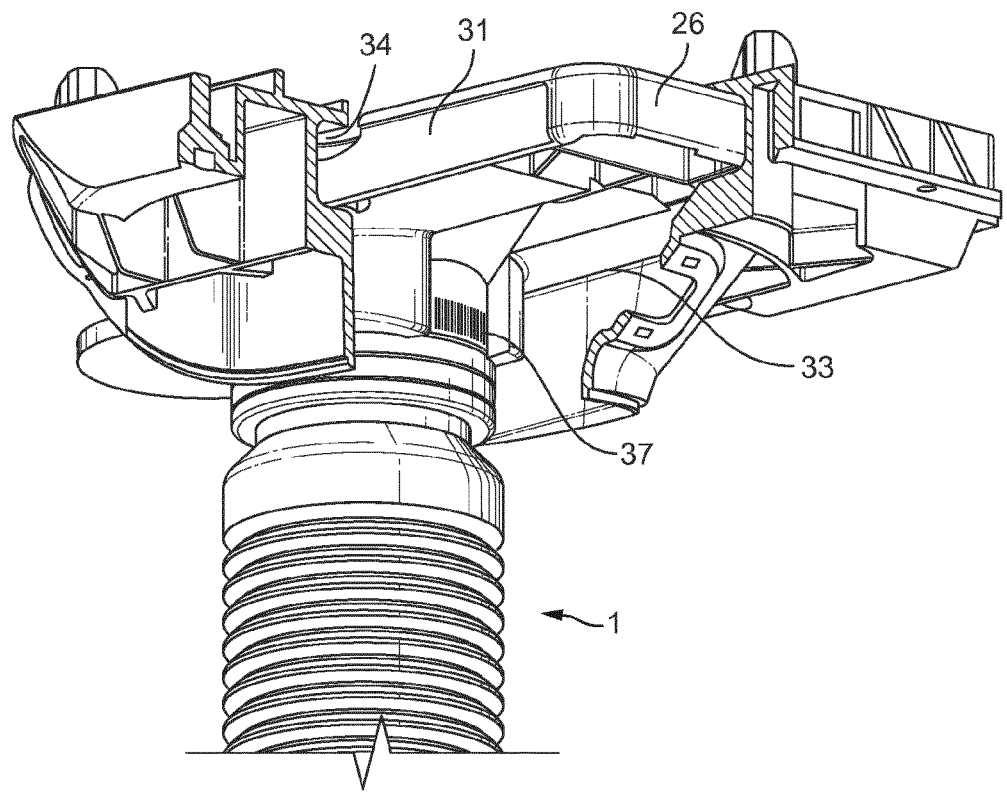
Figure 15A:
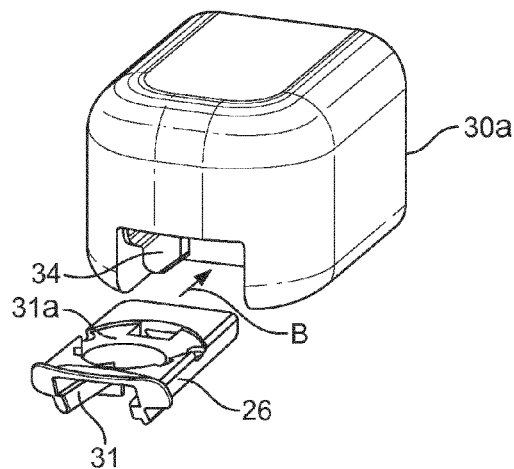
FIG. 15a is a perspective side view of an injection head of the liquid dispensing means and a bottle connector.
Figure 15B:
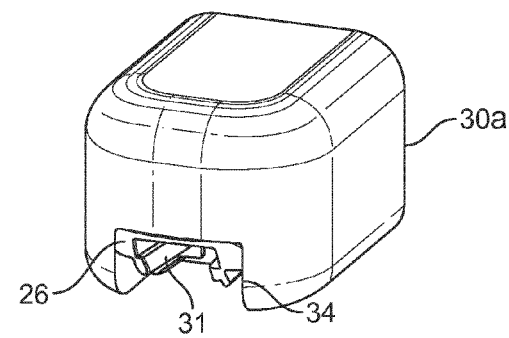
FIG. 15b relates to the embodiment according to FIG. 15a, wherein the bottle connector is inserted into the injection head of the liquid dispensing means.
Figure 15C:
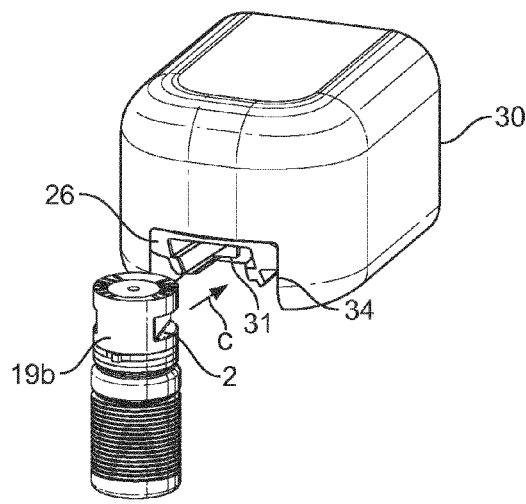
FIG. 15c shows the embodiment according to FIG. 15a being inserted into the injection head by means of the bottle connector.

FIGS. 14a and 14b show the embodiment of the bottle 1 according to FIG. 11a, wherein the bottle 1 is connected to an additional bottle connector 26 that is designed for connecting the bottle 1 to the dispensing means 20 and in particular to a dispensing head 30a of the dispensing means 20 as also shown in FIGS. 15a-15c.

The bottle connector 26 preferably comprises a connecting portion 31 that connects to the connecting means 2 provided at the neck portion 4 or at the disposable portion 19 of the bottle 1. Thereby, the connecting portion 31 may be at least one guiding rail which interacts with the recessed or protruding connection means 2 of the bottle 1 (see FIG. 15c, arrow C).

The connecting portion 31 may as well be designed as a snap-fit connection connecting to the connection means 2 upon insertion of the bottle 1 and/or turning of the bottle 1 about a vertical axis thereof.

The bottle connector 26 is preferably designed to be selectively connected to a receiving recess 34 of the dispensing head 30a (see FIGS. 15a and 15b, arrow B). Thereby, the bottle connector 26 may as well comprise an aperture 31a for holding a cartridge or capsule containing a predefined amount of infant formula base, which is designed to receive the capsule when inserted from above in said aperture 31a (see FIGS. 15a-15c).

The bottle connector 26 preferably comprises integrally formed interface means 33 which are arranged to provide a signal transfer from the dispensing means 20, to which the bottle connector 26 is intended to be connected, to the bottle 1 or vice versa. Thereby, the interface means 33 may be any means enabling the transfer of an optical, electrical and/or acoustical signal between the dispensing means and the bottle 1.

Preferably, the interface means 33 is a mirror arranged at the bottle connector 26 such as to transfer or redirect a signal 35 from the dispensing means 20 towards an outer portion of the bottle 1. Thereby, the signal may be e.g. an optical signal 35 from an optical reader 36, such as a barcode reader, that is transferred by the interface means 33 of the bottle connector 26 to a peripheral outer surface 19b of the disposable portion 19 onto which an optical code such as a barcode 37 may be provided.

It is to be understood that by means of the signal transferred from the bottle 1 to the dispensing means 20 or vice versa, a dedicated control unit (not shown) of the dispensing means 20 may adjust the injection parameters such as the temperature, the flow rate and/or the amount of the liquid to be injected into the compartment 3 of the bottle 1.

Although the present invention has been described with reference to preferred embodiments thereof, many modifications and alternations may be made by a person having ordinary skill in the art without departing from the scope of this invention which is defined by the appended claims.

In particular, additional liquid outlet means may be provided at any portion of the compartment 3 which are designed to be connected to externally provided feeding means 14.

Moreover, the present invention is not restricted to the indicated geometry of the bottle according to the figures. For example, the bottle 1 may be of any geometrical shape such as e.g. oval, squared or spherically shaped.

The invention claimed is:

1. A single-use feeding bottle for dispensing an aqueous nutritional composition to a human from a powdered or concentrated liquid nutritional formula base contained therein, the single-use feeding bottle comprising:

a connection member adapted for connecting the single-use feeding bottle to an external liquid dispenser adapted to supply a liquid to the single-use feeding bottle, the connection member selected from the group consisting of a protrusion, a recession, and combinations thereof;

at least one compartment forming a cavity for containing a predefined amount of the powdered or concentrated liquid nutritional formula base for the preparation of the aqueous nutritional composition upon hydration with the liquid;

a body portion from which a neck portion extends, the neck portion in fluid communication with the at least one compartment;

a liquid inlet designed to be supplied with the liquid from the liquid dispenser; and a filter assembly in a flow path of the liquid from the liquid inlet to the at least one compartment, the filter assembly designed to remove contaminants from the liquid fed into the at least one compartment through the liquid inlet, the neck portion has a smaller diameter than the body portion, the at least one compartment comprises a bottom portion at an opposite end of the at least one compartment from the neck portion, and the filter assembly is positioned in a location selected from the group consisting of within the neck portion and in the bottom portion, the neck portion comprises a single aperture, and the connection member has a configuration selected from the group consisting of (i) formed in the neck portion and circumscribing the single aperture and (ii) formed in the body portion and circumscribing the bottom portion of the at least one compartment.

2. The single-use feeding bottle according to claim 1, further comprising an outlet designed to release a gas and/or the liquid from inside of the single-use feeding bottle to an exterior thereof.

3. The single-use feeding bottle according to claim 2, wherein the filter assembly separates the liquid inlet from the at least one compartment and the outlet so that only a filtered liquid is allowed to pass through the outlet.

4. The single-use feeding bottle according to claim 2, wherein the single aperture defines and/or circumscribes the liquid inlet, and the liquid inlet also forms at least part of the outlet such that the outlet is situated in the neck portion of the single-use feeding bottle.

5. The single-use feeding bottle according to claim 1, further comprising a gas-liquid equilibrium member to allow a gas to leave the at least one compartment as the liquid is fed through the filter assembly into the single-use feeding bottle.

6. The single-use feeding bottle according to claim 1, wherein the liquid inlet is situated in the neck portion of the single-use feeding bottle.

7. The single-use feeding bottle according to claim 1, wherein the liquid inlet is designed to be connected by an external liquid probe of the external liquid dispenser.

8. The single-use feeding bottle according to claim 1, wherein the filter assembly is designed to be selectively removed from the single-use feeding bottle.

9. The single-use feeding bottle according to claim 1, wherein the filter assembly comprises a micro-porous membrane forming a barrier to bacteria.

10. The single-use feeding bottle according to claim 2, wherein at least one component selected from the group consisting of the liquid inlet and the outlet comprises a sealing member for sealing the single-use feeding bottle to prevent ingress of the contaminants before use, and the sealing member is at least partially perforable to enable an external liquid probe to feed the liquid into the filter assembly.

11. The single-use feeding bottle according to claim 10, wherein at least a portion of the sealing member is fixedly connected to the filter assembly and designed to allow a selective removal of the filter assembly from the single-use feeding bottle after liquid feeding.

12. The single-use feeding bottle according to claim 1, further comprising a connector for receiving a liquid feeding member.

13. The single-use feeding bottle according to claim 12, wherein the connector is provided at the neck portion.

14. The single-use feeding bottle according to claim 1, wherein the at least one compartment is made of thin plastic.

15. A beverage production system comprising:
a feeding bottle for dispensing an aqueous nutritional composition to a human from a powdered or concentrated liquid nutritional formula base contained therein, the feeding bottle comprising (a) a connection member adapted for connecting the feeding bottle to an external liquid dispenser adapted to supply liquid to the feeding bottle, the connection member selected from the group consisting of a protrusion, a recession, and combinations thereof, (b) at least one compartment forming a cavity for containing a predefined amount of the powdered or concentrated liquid nutritional formula base for the preparation of the aqueous nutritional composition upon hydration with the liquid, (c) a body portion from which a neck portion extends, the neck portion in fluid communication with the at least one compartment, (d) a liquid inlet designed to be supplied with the liquid from the external liquid dispenser, and (e) a filter assembly in a flow path of the liquid from the liquid inlet to the at least one compartment, the filter assembly designed to remove contaminants from the liquid fed into the at least one compartment through the liquid inlet, the neck portion has a smaller diameter than the body portion, the at least one compartment comprises a bottom portion at an opposite end of the at least one compartment from the neck portion, and the filter assembly is positioned in a location selected from the group consisting of within the neck portion and in the bottom portion, the neck portion comprises a single aperture, and the connection member has a configuration selected from the group consisting of (i) formed in the neck portion and circumscribing the single aperture and (ii) formed in the body portion and circumscribing the bottom portion of the at least one compartment; and
the external liquid dispenser comprising a connector for connecting to at least a portion of the feeding bottle and the outlet for supplying the liquid to the feeding bottle.

16. A beverage production system comprising:
a bottle for dispensing an aqueous nutritional composition to a human from a powdered or concentrated liquid nutritional formula base contained therein, the bottle comprising (a) a connection member adapted for connecting the bottle to an external liquid dispenser adapted to supply liquid to the bottle, the connection member selected from the group consisting of a protrusion, a recession, and combinations thereof, (b) at least one compartment forming a cavity for containing a predefined amount of the powdered or concentrated liquid nutritional formula base for the preparation of the aqueous nutritional composition upon hydration with the liquid, (c) a body portion from which a neck portion extends, the neck portion in fluid communication with the at least one compartment, a liquid inlet designed to be supplied with the liquid from the external liquid dispenser, and (d) a filter assembly in a flow path of the liquid from the liquid inlet to the at least one compartment, the filter assembly designed to remove contaminants from the liquid fed into the at least one compartment through the liquid inlet, the neck portion has a smaller diameter than the body portion, the at least one compartment comprises a bottom portion at an opposite end of the at least one compartment from the neck portion, and the filter assembly is positioned in a location selected from the group consisting of within the neck portion and in the bottom portion, the neck portion comprises a single aperture, and the connection member has a configuration selected from the group consisting of (i) formed in the neck portion and circumscribing the single aperture and (ii) formed in the body portion and circumscribing the bottom portion of the compartment;
the external liquid dispenser comprising an outlet for supplying the liquid to the bottle; and
a bottle connector for connecting the liquid inlet of the bottle to the outlet of the external liquid dispenser.

17. The beverage production system according to claim 15, wherein the external liquid dispenser comprises an opener designed to open a sealing membrane of the filter assembly of the feeding bottle.

18. The beverage production system according to claim 16, wherein the external liquid dispenser comprises an opener designed to open a sealing membrane of the filter assembly of the bottle.

19. The single-use feeding bottle according to claim 1, wherein:
- the single aperture of the neck portion defines and/or circumscribes the liquid inlet and defines an end of the bottle at which the bottle terminates opposite from the bottom portion of the at least one compartment, and
- at least a portion of the filter assembly is positioned within the single aperture of the neck portion and circumscribed by the connection member.

20. The single-use feeding bottle according to claim 1, wherein the single aperture of the neck portion is the only aperture in the neck and body portions of the bottle.

* * * * *